US012728884B2

(12) United States Patent
Chamaa et al.

(10) Patent No.: US 12,728,884 B2
(45) Date of Patent: Sep. 8, 2026

(54) STORING MAP DATA BASED ON METADATA

(71) Applicant: Zoox, Inc., Foster City, CA (US)

(72) Inventors: Jean-Luc Pierre Chamaa, San Carlos, CA (US); Christopher Patton, Daly City, CA (US); Elena Stephanie Stumm, Berkeley, CA (US)

(73) Assignee: Zoox, Inc., Foster City, CA (US)

( * ) Notice: Subject to any disclaimer, the term of this patent is extended or adjusted under 35 U.S.C. 154(b) by 194 days.

(21) Appl. No.: 18/203,997

(22) Filed: May 31, 2023

(65) Prior Publication Data

US 2024/0400085 A1 Dec. 5, 2024

(51) Int. Cl.

*B60W 60/00* (2020.01)
*B60W 50/00* (2006.01)
*H04L 9/32* (2006.01)

(52) U.S. Cl.

CPC .......... *B60W 60/001* (2020.02); *B60W 50/00* (2013.01); *H04L 9/3239* (2013.01); *B60W 2050/0005* (2013.01); *B60W 2556/40* (2020.02); *H04L 2209/84* (2013.01)

(58) Field of Classification Search

CPC ............... B60W 60/001; B60W 50/00; B60W 2050/0005; B60W 2556/40; H04L 9/3239; H04L 2209/84

See application file for complete search history.

(56) References Cited

U.S. PATENT DOCUMENTS 8,527,877 B2 * 9/2013 Wohlert ................ H04L 65/764 715/727
2016/0098474 A1 * 4/2016 Leininger ............ G06F 16/285 707/740
2019/0288850 A1 * 9/2019 Beecham et al. ....... G06F 16/27
2019/0334700 A1 * 10/2019 Callan ....................... H04L 9/06
2020/0389469 A1 * 12/2020 Litichever et al. ..... H04L 12/18
2021/0123763 A1 * 4/2021 Cajias .................. G01C 21/367
2021/0211763 A1 * 7/2021 Berner ............... H04N 21/8456

FOREIGN PATENT DOCUMENTS

DE 112021000094 T5 * 6/2022 ......... G06K 9/00825
JP 6946729 B2 * 10/2021 ......... H04L 12/1822
WO WO-2010070794 A1 * 6/2010 ....... G06F 17/30156

* cited by examiner

*Primary Examiner* — Scott A Browne
*Assistant Examiner* — Nazia Afrin
(74) *Attorney, Agent, or Firm* — Lee & Hayes, P.C.

(57) ABSTRACT

Techniques are discussed for generating, maintaining, and accessing maps to be used for vehicle localization and navigation. A map of a region may include map data representing discrete tiles of the region, and be associated with a map manifest listing pointers to content of the map. In some cases, the map manifest may have a recursive structure which references other map manifests. The map files may be stored on a storage system that avoids duplication and allows efficient determination of changes to content. For example, the stored map files may each be associated with a content-based hash value, which may be incorporated into a filename or URI of the map file. Computing systems on a vehicle may use comparison of the content-based hash values to determine files that have changed and need to be downloaded. The computing systems may also use hash values to determine accuracy of downloaded files.

20 Claims, 6 Drawing Sheets

226
228
Map A
Map A
Map C
Map B
Map B
230
232

FIG. 2B 238
240
234
Map B
Map C
Map A
236

FIG. 2C 248
244
246
Map A
Map B
242
250
Map C

FIG. 2D

STORING MAP DATA BASED ON METADATA

BACKGROUND

Map data representing an environment is often used by vehicles navigating within the environment. In some cases, map data may include a spatial representation of the environment using two- or three-dimensional tiles, as well as sensor data, imagery, and/or semantic labels identifying map elements, corresponding to such tiles. Such map data can be stored locally on-board the vehicle or can be accessed remotely over a network. Due to their large size, storage and access of such map data may be challenging. In addition, update of such map data on the vehicle on-board memory via the network can be time consuming.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 2B-2D illustrate various scenarios where existing maps may be combined to generate a new map, in accordance with examples of the disclosure.

DETAILED DESCRIPTION

Figure 1:
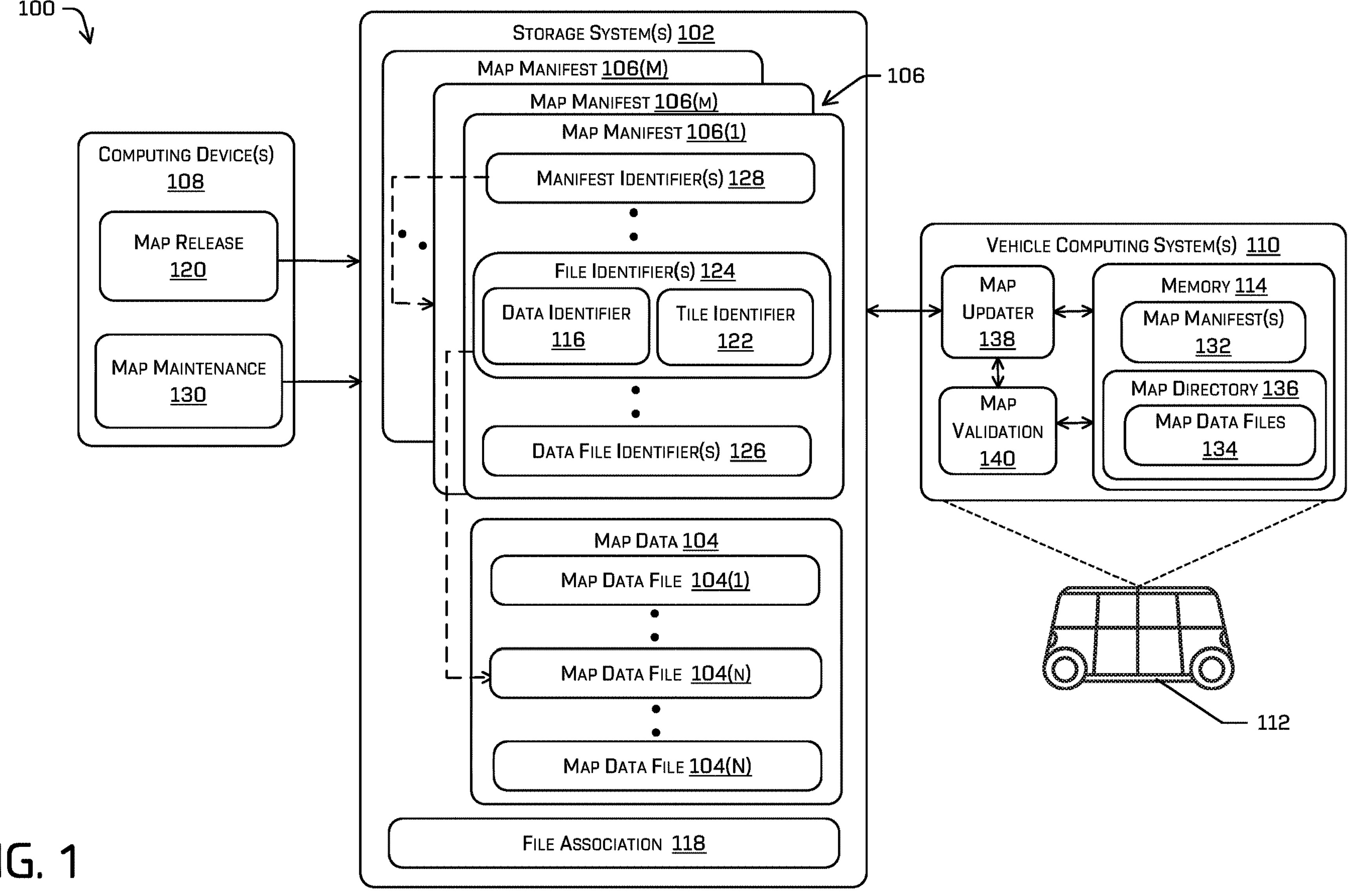
FIG. 1 illustrates an example system implementing storage, update, and access techniques for map data used by a vehicle, in accordance with examples of the disclosure.

This disclosure is directed to techniques for generating, maintaining, and accessing maps for vehicle localization and navigation in an environment. In some examples, maps may comprise map data of various types, associated with discrete portions of a geographical region, such as two- or three-dimensional geospatial tiles. For example, each tile may correspond to a polygon in a 3D mesh representation of the region, or a cell in a two-dimensional grid representation of the region. As a vehicle traverses through the region, the vehicle may use the map data representing an area of the environment around the vehicle to determine its location in the environment, and/or plan a trajectory for navigating in the environment.

In examples, the map data associated with each tile may include two- or three-dimensional (2D or 3D) geospatial data at low- or high-resolution, intensity data (e.g., visual data, LiDAR image), point cloud(s) (e.g., 3D radar or LiDAR data), top-view image(s) (e.g., of a ground surface), and the like. As can be understood, size of the map data covering potential regions of operation of a vehicle can be very large. As an example, with tiles representing a 25 m×25 m square, a total size of the map data covering an area of 25 km$^2$ may exceed 30 GB. In examples, the map data may be maintained in a local memory of the vehicle (e.g., on-board the vehicle). In such examples, the vehicle may need to update the map data or access new map data periodically, or in response to changes in the environment. The vehicle may access the map data from a remote storage location (e.g., cloud storage) over a network. Due to large size of the map data, downloading data from the remote storage may be time consuming. In examples of this disclosure, computing system(s) of the vehicle may efficiently determine a portion of the map data that needs to be downloaded from the remote storage.

In examples of this disclosure, the remote storage location storing the map data may implement techniques to avoid duplicate storage of data, and enable efficient determination of changes in data. For example, each individual file may be associated with respective identifier or key that is based on content of the file. In some examples, an identifier corresponding to each file can be determined by inputting content of the respective file to a hash function, and computing a hash value based on the content. By way of example and not limitation, the hash function may be a cryptographic hash function, such as Secure Hash Algorithm (SHA)-256 or SHA-512. In general, the identifier may be any metadata based on content of a file that characterizes the content (e.g., change in content results in a change in the metadata) and can be repeatably computed. The storage system may store each file at a storage location associated with its respective identifier. As an example, the identifier may be included in a filename or Universal Resource Identifier (URI) corresponding to the file, indicating a name and location of the file. The storage system may avoid duplication of content by keeping track of identifiers based on content of files on the storage system, and asserting that each identifier (or key) appears no more than once.

In examples, each map may be represented by a map manifest, indicating a complete listing of all content for the map. Since map manifests are themselves files, an identifier may also be determined for each map manifest file by inputting content of the map manifest file to the hash function, as described. The map manifest may comprise identifiers or pointers to content files (e.g., map data files), as well as identifiers of other map manifests (sub-manifests). It should be noted that since the identifier is based on a hash value of content, any changes in a map manifest (e.g., a change in the map data files included in the map manifest, or a change in sub-manifests referenced in the file), will result in a different identifier. In examples of this disclosure, the map manifest may exhibit a recursive structure, where a map manifest may include identifiers of other map manifests, which may, in turn, may include identifiers of yet other map manifests. For example, a map manifest of a large region may be sub-divided into sub-regions represented by sub-manifests to reduce a file size of the map manifest, creating a map manifest tree structure that may logarithmically reduce complexity of accessing map data files at a leaf-level of the tree structure. To ensure that an identifier of a map manifest does not change simply due to a reordering of entries in the map manifest, the entries may be sorted to produce a consistently ordered map manifest (e.g., by using alphanumeric ordering).

In examples, maps may be created and released to the storage system by map creators. For example, new maps may be released when a new geographic area is being mapped, a new geofence is being created (e.g., in an urban area) or expanded, or a geographic area or geofenced region is being re-mapped without relying on previous maps of the area. In examples, maps may be associated with a semantic name and/or other metadata, and a mapping between the semantic name (e.g., name of a place in human-readable form) and its corresponding map manifest may be maintained at the storage system for ease-of-access of the map.

In examples, maps may be released recursively (e.g., from bottom-to-top of the tree structure), by uploading map data files first (e.g., starting at a leaf-level of the tree structure, and moving up the tree structure). For example, a map may be released by uploading map data files referenced by a map manifest first, before uploading the map manifest. In some examples, the map data files may be uploaded individually, and techniques can include determining that each map data file has been transmitted, received, and stored correctly at the storage system after each upload. As an example, processor(s) of the storage system may compute a checksum, e.g., using a MD5 ("message-digest" algorithm) hash function, to validate data integrity during upload. If a checksum error is determined, the map data file may be re-uploaded. This ordering of uploads ensures that the storage system does not store map manifests that include references to map data files or other map manifests that are incomplete or erroneous. For example, in a situation where a release of a map is terminated in a partially-complete state, the map manifest will not be available at the storage system, and therefore, the map cannot be mistakenly referred to. In such a situation, the map release may be continued at a later time by uploading only the files that were not already correctly uploaded, saving time needed for recovering from a failed release.

As described, the storage system may avoid duplication of content. Therefore, if more than one tile is associated with a same content stored in a map data file, a single copy of the map data file will be stored at the storage system, with the single copy being referenced multiple times. For example, a first map and a second map may include an overlapping area associated with same map data files. In such an example, a first map manifest corresponding to the first map, and a second map manifest corresponding to the second map may both include the same identifiers for the map data files associated with the overlapping area, but only a single copy of the map data files will be stored. As another example, though "blank" map data files may frequently occur associated with various tiles due to reasons such as obstruction of sensors or lack of coverage of some regions of an environment, the storage system may store a single "blank" map data file in its physical storage, and all map manifests that include such a blank map data file may reference the identifier associated with the content of the single blank map data file.

In examples, map manipulations such as combining existing maps, both overlapping and disjoint, to create a new map may be necessary for expanding a map to include other mapped regions, expanding a geofenced area, updating a map using data from another map, and the like. Such map manipulations can be performed by operations on corresponding map manifests, without accessing or making any changes to the map data files referenced in the map manifests. In some examples, only maps already released to the storage system may be combined e.g., a map must be released to the storage system before performing any operations using its map manifest. As an example, a first map manifest corresponding to a map of a first region and a second map manifest corresponding to a map of a second region may be combined by including all entries of the first map manifest and the second map manifest, and ordering the entries using a standardized ordering (e.g., alphanumeric ordering). If there is an overlap between the first region and the second region, both the first map manifest and the second map manifest will include map data files corresponding to same tiles in the overlap region. In this scenario, the map data files for tiles in the overlap region may be selected from either the first map or the second map based on precedence rules. As non-limiting examples, the precedence may be based on timestamp of the associated map data files (e.g., a more recent map data file may have precedence over an earlier map data file), level of detail and/or accuracy of the associated map data files (e.g., a higher resolution and/or a higher accuracy may have higher precedence), sensor used to capture the map data (e.g., data captured using a more advanced version of a sensor may have higher precedence), and the like.

As described, a vehicle may maintain, in its local memory, at least a portion of the maps stored in the storage system (e.g., map manifests, map data files). Vehicle computing systems may perform checks to determine if files need to be downloaded from the storage system. As non-limiting examples, such checks may be performed periodically based on a schedule, as a result of a notification to the vehicle computing systems that new and/or updated maps are available for download, when the vehicle travels in a new geographic region or a geographic region it has not traveled in for a threshold period of time, and the like. For a given map, the vehicle computing systems may check its map manifest in a top-down order e.g., starting at a top-level map manifest. The vehicle computing systems may compare a manifest identifier corresponding to the map in the local memory with a manifest identifier of a corresponding map in the storage system. If the manifest identifiers are identical, there is no change in the map manifests, and therefore, the particular map is unchanged and no further action is required. If the manifest identifiers are not identical, the map manifest may be checked recursively in the top-down order, to determine map manifests or map data files where the identifier in the local memory does not match the corresponding identifier on the storage system, indicating a change in the corresponding file. Only the changed file(s) need to be downloaded, resulting in a large saving in time required for updating maps compared to downloading all maps periodically.

As discussed in the context of uploading maps, files may be verified for accuracy during downloads from the storage system. In some examples, a MD5 checksum of a file may be compared before and after download, and the file determined to be accurate based on the checksums matching. As another example, an identifier may be computed by inputting content of the downloaded file to the hash function (e.g., SHA-256), and a computed hash value may be compared with a filename or URI of the downloaded file (which includes its original identifier, as discussed earlier). If there is a match, then the file has been downloaded correctly, and if there is a mismatch, the file may be re-downloaded. Map data files and map manifests already stored in the local memory of the vehicle may also be validated for correctness using the above process e.g., during periodic checks. In some examples, correctness of the map manifests and the map data files, or a portion of the files related to a region of operation of the vehicle, may be checked while the vehicle is not in operation e.g., overnight, or while stored in a garage, and/or before start of operation.

The techniques discussed herein can be utilized by an autonomous vehicle, robotic platform, and/or by a sensor system to perform a number of operations. For example, operations can include performing an action based at least in part on the map data, wherein the action includes at least one of a localization action, a perception action, a prediction action, or a planning action. In some instances, a localization action can include determining a location of the vehicle, sensor system, or robotic platform by using the map data. For example, relevant map data can be loaded into a working memory, such as a random-access memory or cache memory, associated with a graphics processing unit (GPU), which can be used to perform various localization algorithms, such as SLAM (simultaneous localization and mapping) and CLAMS (calibration, localization, and mapping, simultaneously). In some instances, a perception action can include, but is not limited to, identifying static objects or dynamic objects in an environment based at least in part on the map data (e.g., using the map data to perform background subtraction, discerning semantic information between points, and the like). In some instances, a prediction action can include generating one or more predictions about a state of one or more objects in the environment (or about the environment itself) such as, for example, incorporating map data as constraints for potential actions of detected agents. In some instances, a planning action can include generating a trajectory for the vehicle, sensor system, or robotic platform in an environment, such as, for example, incorporating the map data as constraints for potential vehicle trajectories.

In examples, the techniques described herein can improve a functioning of a computing device by providing a framework for efficiently maintaining up-to-date maps in the memory of the computing device. As described, the techniques may determine which files are changed or corrupted, and only transmit or download the affected files. In some examples, the techniques also describe creation of new maps without re-transmission of underlying map data files. Therefore, the techniques reduce network usage, and improve speed of operation of file transfers needed to maintain maps, both on network-accessible storage system(s) (e.g., cloud storage) and on on-board memory of vehicles and/or mobile devices. The techniques also describe maintaining an accuracy of map files at the vehicle, and can improve an accuracy of localizing the vehicle in an environment. In addition, ensuring that same content is not duplicated in multiple files can reduce an amount of memory being used on the vehicle, and at the remote storage system and/or can increase a size of an area represented by the stored maps without increasing a size of the memory. Further, improving memory characteristics of map data, as discussed herein, reduces energy consumption of processors operating on such data, and/or reduces an amount of heat generated by such processors, thereby reducing an amount of cooling required for such processors. These and other improvements to the functioning of the computer are discussed herein.

The techniques described herein can be implemented in a number of ways. Example implementations are provided below with reference to the following figures, FIGS. 1-5. Although discussed in the context of an autonomous vehicle, the methods, apparatuses, and systems described herein can be applied to a variety of systems (e.g., a sensor system or a robotic platform), and is not limited to autonomous vehicles. In another example, the techniques can be utilized in an aviation or nautical context, or in any system using machine vision (e.g., in a system using image data). Additionally, the techniques described herein can be used with real data (e.g., captured using sensor(s)), simulated data (e.g., generated by a simulator), or any combination of the two.

FIG. 1 illustrates an example system 100 implementing storage, update, and access techniques for map data used by a vehicle, in accordance with examples of the disclosure. As shown in FIG. 1, storage system(s) 102 may store map data 104 and associated files, such as map manifest(s) 106, and may implement storage based on metadata computed from content of respective files. Computing device(s) 108 may implement functionality associated with releasing and maintaining map data files 104(1), . . . , 104(*n*), . . . , 104(N) (n=[1 . . . N]) (collectively, the map data 104) and map manifests 106(1), . . . , 106(*m*), . . . , 106(M) (m=[1 . . . M]) (collectively, the map manifests 106) on the storage system(s) 102. Vehicle computing system(s) 110 of vehicle 112 may access the storage system(s) 102 for downloading map files 104, 106 to an on-board memory 114 of the vehicle 112.

In some examples, the storage system(s) 102, which may be network-accessible storage (e.g., cloud storage), may implement a content-addressable storage (CAS) system for storing data. In such a system, each individual file, such as the map data file 104(*n*), is associated with respective data identifier or key. A data identifier 116 corresponding to each map data file 104(*n*) is determined by inputting content of the respective map data file 104(*n*) to a hash function, and computing a hash value based on the content. By way of example and not limitation, the hash function may be a cryptographic hash function, such as Secure Hash Algorithm (SHA)-256 or SHA-512. Other examples of the hash function may include Digital Signature Algorithm (DSA), and variants of SHA such as SHA-1, SHA-2, and SHA-3. The storage system(s) 102 may store each map data file 104(*n*) at a physical storage location associated with the data identifier 116 of the respective file. For example, the storage system(s) 102 may maintain a file association 118, which may be a data structure (e.g., a dictionary or an associative array) storing a mapping between each data identifier 116 and a respective physical storage location of the corresponding map data file 104(*n*).

In some examples, the map data file 104(*n*) may be assigned a filename corresponding to its respective data identifier 116, thus allowing the filename to be used to locate the map data file 104(*n*), in a manner similar to a traditional file system. Since the data identifier 116 is a hash value based on the content of the map data file 104(*n*), any change in content will result in a different data identifier value, and therefore, a mismatch between the filename and a hash value of the changed content. As an advantageous aspect of this example, any stored file in the storage system(s) 102 may be verified for data accuracy by computing its hash value by inputting its content to the hash function, and determining whether the hash value matches the respective filename. For example, a match validates data integrity of the file, whereas a mismatch indicates that data in the file is corrupted or changed. In some examples, the filename may include additional elements in addition to the respective data identifier corresponding to the file's content, and a match between the hash value and the filename may be determined by matching a portion of the filename that incorporates the data identifier while ignoring the additional elements (e.g., human-readable place names, indicators of type of data, special characters, etc.). In some examples, the filename may be a Universal Resource Identifier (URI), indicating a name and location of the file.

It is to be noted that the storage system(s) 102 may ensure efficient storage of data with no duplication (e.g., content of each map data file 104(*n*) is unique). For example, if a first map data file is presented for storage, and its content is identical to a second map data file already stored in the storage system(s) 102, a first data identifier based on the content of the first map data file will be identical to a second data identifier, corresponding to the second map data file, that already exists in the file association 118. The storage system(s) 102 may ensure that each data identifier (or key) appears no more than once in the file association 118, and therefore, will not store the first map data file in a separate physical location from the second map data file, nor add the first data identifier to the file association 118. Any reference(s) to the first map data file (e.g., in map manifests) may, instead, be replaced with the second data identifier, and may therefore, be mapped to a physical storage location for the second map data file. However, on rare occasions, the hash function may compute a same identifier value for map data files with different content, requiring separate conflict resolution mechanisms for handling such a "hash collision". In examples where the filename or URI of the map data file 104(*n*) is based on the data identifier 116, the filename or URI would be identical for the first map data file and the second map data file with identical content, and therefore, a duplicate is not stored in a separate physical location.

In examples, each map in the storage system(s) 102 may be identified by a semantic name representing a geographic area covered by the map (e.g., San Francisco-zone 45). Each map may be represented by a map manifest file, such as the map manifest 106(*m*), indicating a complete listing of all content (e.g., map data files) for the map. The listing may comprise pointers to content files. The map data 104 and the associated map manifest(s) 106 may be generated and released to the storage system(s) 102 by a map release component 120 implemented on the computing device(s) 108, which may correspond to computing device(s) of users responsible for creation and maintenance of maps for vehicles operations. For example, the map release component 120 may release new maps to the storage system(s) 102 when a new geographic area is being mapped, a new geofence is being created (e.g., in an urban area), or a geographic area or geofenced region is being re-mapped without relying on previous maps of the area, and the like.

In examples, a geographic region may be divided into tiles for purposes of generating maps, each tile being associated with a geospatial location, the geographic region being represented by a plurality of tiles. As an example, a tile may correspond to a cell in a two-dimensional grid division of the region e.g., a tile may represent a 25 meter×25 meter area of the geographic region, and be spatially localized in a 2D coordinate reference system. As another example, a tile may correspond to a polygon in a 3D mesh representation of the region, and may be spatially localized in a 3D coordinate reference system. In examples of the present disclosure, tiling of maps may ensure that a consistent representation of geographic areas is obtained, with boundaries between any two maps aligning with tile boundaries. The map release component 120 may assign a tile identifier 122 to each tile. In examples, the tile identifier 122 may be based on a relative location of the tile within a geographic region, an absolute location in a 2D- or 3D-coordinate reference system, a location within a hierarchical file structure, and the like. The tile identifiers 122 may be based on a standardized naming convention so that tiles corresponding to a same underlying geographic area have the same tile identifier across different maps.

In examples, the map release component 120 may associate a tile with map data of various types. By way of example and not limitation, the types of map data may include two- or three-dimensional (2D or 3D) geospatial data at low- or high-resolution, road network data indicating roadways, service area information, pre-defined routes and waypoints, points of interest, intensity image(s) (e.g., visual data, LiDAR image), point cloud(s) (e.g., 3D radar or LiDAR data), top-view image(s) (e.g., of a ground surface), altitude maps showing height of a ground plane, radio-frequency (RF) data, and the like. The map data may also include information derived from analysis of other map data, or indicate a confidence level or validation associated with other map data. In some examples, map data may include ephemeral or time-limited data such as traffic conditions or temporary exclusion zones where driving is not allowed during a period of time. The map release component 120 may upload, to the storage system(s) 102, separate map data files 104(1), . . . , 104(N) corresponding to each type of map data, each file being associated with a tile identified by its tile identifier 122. As shown in FIG. 1, the individual map data file 104(*n*) may be associated with its respective data identifier 116 and respective tile identifier 122, which together, may comprise a file identifier 124 for the map data file 104(*n*). As discussed, a geographic region may include a plurality of tiles, each tile being associated with map data files comprising data of various types. Therefore, a map of the geographic region may comprise the map data files associated with each of the plurality of tiles. In examples, the map release component 120 may include, in each map manifest 106(*m*), file identifiers 124 indicating the map data files included in the map. The map manifest 106(*m*) may also include data file identifiers 126 for other types of data files e.g., associated with the map as a whole instead of with individual tiles. Examples of such data files may include identification of various features within a region represented by the map manifest 106(*m*), such as traffic lights, road signs, road names etc.

As discussed above, the storage system(s) 102 may ensure that there is no duplication in the stored map data files 104(1), . . . , 104(N). Therefore, if two tiles are associated with a same content stored in a map data file, file identifiers may have the same data identifier 116, but different tile identifiers 122. As an example, due to reasons such as obstruction of sensors or lack of coverage of some regions of an environment, content of map data files associated with some tiles may be "blank" (e.g., a black image of same dimensions as an image with meaningful content). Though such blank map data files may frequently occur associated with various tiles, the storage system(s) 102 stores a single "blank" map data file in its physical storage, and all map manifests that include such a blank map data file may reference the data identifier associated with the single blank map data file. As another example, a first map and a second map may include an overlapping area associated with same map data files. In such an example, a first map manifest corresponding to the first map, and a second map manifest corresponding to the second map may both include the same data identifiers for the map data files associated with the overlapping area.

In examples, the map manifests 106 are also files stored on the storage system(s) 102, and therefore, manifest identifiers(s) may be generated for each map manifest 106(*m*) using a process similar to the generation of the data identifier 116 for the map data file 104(*n*). For example, content of the map manifest 106(*m*) file may be inputted to a hash function, which may be the same hash function used to generate the data identifiers 116 corresponding to the map data 104, to generate a manifest identifier for the map manifest 106(*m*). The manifest identifier and its mapping to a physical storage location where a file containing the map manifest 106(*m*) is located, is also stored in the file association 118. In some examples, filename of a file containing a map manifest may be based on the manifest identifier (e.g., include the manifest identifier in the filename). The manifest identifier may be associated with the semantic name of the map it represents.

In some examples, the geographic region may comprise sub-regions, each sub-region having its own map. In such examples, the map manifest 106 corresponding to the map of the geographic region may also include manifest identifier(s) 128, identifying other map manifest(s) corresponding to the sub-regions. As can be understood, the map manifest 106(*m*) may exhibit a recursive structure, where a map manifest includes manifest identifiers for other map manifests, which may, in turn, include manifest identifiers of yet other map manifests. In such examples, manifest identifier(s) in a top-level map manifest may be recursively followed till, at a leaf-level, the file identifiers 124 for the map data files 104 are obtained.

In some examples, the map manifest 106(*m*) may be sub-divided into sub-manifests to reduce a file size of the map manifest 106(*m*), particularly when the map manifest 106(*m*) includes a large number of tiles (e.g., a large geographical area). For example, if a top-level map manifest includes L sub-manifests, each sub-manifest representing T tiles, then the top-level map manifest represents L*T tiles. More layers of sub-manifests may be added to further reduce file sizes of map manifests e.g., sub-manifests including further sub-manifests, creating a map manifest tree structure that may logarithmically reduce complexity of accessing map data files at a leaf-level of the tree structure. Each sub-manifest may represent a group of tiles, and changes at the group-level may be tracked by determining a change in a manifest identifier of the sub-manifest.

It should be noted that any changes in a map manifest (e.g., a change in the map data files included in the map manifest), will result in a different manifest identifier, and the changed map manifest will be treated as a new map manifest with a corresponding new manifest identifier. To ensure that a manifest identifier of a map manifest does not change simply due to a reordering of items (e.g., file identifier(s) 124, manifest identifier(s) 128, etc.) in the map manifest, the map release component 120 may sort items to produce a consistently ordered map manifest (e.g., by using alphanumeric ordering). In some examples, different map manifests for a same geographic region may be retained in the storage system(s) 102 (e.g., to maintain backward compatibility, to keep different version numbers for tracking changes etc.).

The map release component 120 may release a map to the storage system(s) 102 by uploading the map manifest 106(*m*) for the map to the storage system(s) 102 along with the corresponding map data files 104 and other data files 126 referenced in the map manifest 106(*m*), and recursively, uploading referenced files for any map manifests (or sub-manifests) referenced in the map manifest 106(*m*). In examples, the map release component 120 may release a map by uploading map data files referenced by a map manifest first, before uploading the map manifest. In some examples, the map data files 104 may be uploaded individually, determining that each map data file 104(*n*) has been transmitted, received, and stored correctly at the storage system(s) 102 after each upload. For example, the map release component 120 may compare a first value (or "checksum") based on content of a map data file to be released, and verify that a second value based on content of the stored map data file at the storage system(s) 102 matches the first value. If a mismatch is determined, the map release component 120 may re-upload the map data file. In some examples, processor(s) of the storage system(s) 102 may compute a checksum using MD5 ("message-digest" algorithm) to validate data integrity during upload. Alternatively, or in addition, data integrity may be validated using Cyclic Redundancy Check (CRC) algorithm (e.g., CRC32). In other examples, both a MD5 ("message-digest" algorithm)-based checksum and a SHA-based checksum may be computed for checking data integrity of uploaded files.

After the map data files associated with the map have been correctly stored in the storage system(s) 102, the map release component 120 may then upload a map manifest for the map. In examples where the map manifest 106(*m*) being uploaded exhibits a recursive structure, map manifests (or sub-manifests) may be uploaded from bottom-to-top e.g., from a lowest level of the hierarchy (containing map data files), to the top level, and each upload may be verified for accurate upload before a higher level map manifest is uploaded. This ordering of uploads ensures that the storage system(s) 102 does not store map manifests that include references to map data files or map manifests that are incomplete or erroneous. For example, in a situation where a release of a map is terminated in a partially-complete state, the map manifest is not available at the storage system(s) 102, and therefore, the map cannot be mistakenly referred to (e.g., in other map manifests). In such a situation, the map release component 120 may continue the release process at a later time by continuing uploads from the last map data file that was verified as received at the storage system(s) 102 correctly. The map release component 120 may skip uploading the map data files that were already correctly uploaded, saving time needed for recovering from a failed release.

The map release component 120 may add an entry to the file association 118 indicating a map manifest corresponding to a released map (e.g., associating an identification or semantic name of the map with its map manifest). The entry may also include additional metadata associated with the map. The file association 118 on the storage system(s) 102, may thus, be used to store a top-level list of all map manifests corresponding to maps released to the storage system(s) 102.

The computing device(s) 108 may also implement a map maintenance component 130 for map manipulations that do not require an upload of new data files (such as the map data files 104(1), . . . (N)). For example, map manipulations such as combining existing maps, both overlapping and disjoint, to create a new map may be necessary for expanding a map to include other mapped regions, expanding a geofenced area, updating a map using data from another map, and the like. Such map manipulations can be performed by operations on corresponding map manifests, without accessing or making any changes to the map data 104. The map maintenance component 130 may perform operations on existing map manifests to create new map manifest(s) corresponding to the new map obtained by combining existing maps, as will be described in further detail with reference to FIGS. 2A-2D. In some examples, a map may always be released to the storage system(s) 102 before the map maintenance component 130 can perform operations on its map manifest. Though depicted in FIG. 1 as implemented on the computing device(s) 108 for illustrative purposes, it is contemplated that the map maintenance component 130 can additionally, or alternatively, be implemented on the vehicle computing system(s) 110. As can be understood, operations on map manifests are light-weight computations, and thus, do not require large computational resources. Processes associated with the components 120, 130 are also described further with reference to FIGS. 4 and 5.

In examples, the vehicle computing system(s) 110 of a vehicle, such as the vehicle 112 may access the storage system(s) 102 to download maps for localization and/or navigation in a region of operation. For purposes of illustration, the vehicle 112 can be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle 112 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled.

The vehicle computing system(s) 110 may include the memory 114, which may be on-board the vehicle 112, storing map manifest(s) 132 and map data files 134 downloaded from the storage system(s) 102, and associated manifest identifiers and data identifiers (which may be incorporated in filenames, or stored in a directory, as discussed above). In some examples, the map data 134 in the local memory 114 may be stored in a map directory structure 136 for ease-of-access during vehicle operations. In such examples, the tile identifier 122 may identify a location (e.g., a sub-directory name/path) of corresponding map data files 134 in the map directory structure 136. In some examples, the map directory structure 136 may store links (or pointers) to physical storage locations of the map data files 134, rather than data contained in the map data files 134.

The vehicle computing system(s) 110 may implement a map updater component 138 for maintaining the map manifest(s) 132 and the map data files 134 in the memory 114 (e.g., keeping files up-to-date). The map updater component 138 may check the file association 118 for new map(s) or maps needing to be updated. The map updater component 138 may perform the check periodically based on a schedule, as a result of a notification to the vehicle computing system(s) 110 that new and/or updated maps are available for download, when the vehicle 112 travels in a new geographic region or a geographic region it has not traveled in for a threshold period of time, and the like. As discussed, each map in the file association 118 is associated with a map manifest, and any change at any level of a map manifest (e.g., reached by traversing the map manifest recursively) results in a different manifest identifier. To determine if any portion of a particular map (e.g., identified by a location name or coordinates) needs to be updated, the map updater component 138 may compare a manifest identifier corresponding to the map in the memory 114 with a manifest identifier of a corresponding map in the storage system(s) 102. If the manifest identifiers are identical, there is no change in the map manifests, and therefore, the particular map is unchanged and no further action is required. If the manifest identifiers are not identical, the map updater component 138 may recursively traverse the map manifest in a top-down order (e.g., starting at a top-level map manifest) and follow each sub-manifest and file identifier listed in the map manifest, comparing the manifest identifier or the data identifier values with respective local hash values to determine which file(s) have changed. Only the changed file(s) need to be downloaded, as discussed further with reference to FIG. 5. The map updater component 138 may update the map manifest(s) 132 that reference the changed file(s) so that the map manifest(s) 132 reference or point to the downloaded files corresponding to the changed file(s).

The vehicle computing system(s) 110 may further implement a map validation component 140 for validating file(s) for correctness. As an example, the map validation component 140 may test a downloaded map data file for accuracy by generating a hash value by inputting content of a map data file being tested to the hash function, and comparing the resultant hash value to the respective data identifier of the map data file. As discussed, the respective data identifier may be embedded in a filename of the map data file, or may be accessed from the storage system(s) 102 (e.g., from the file association 118). If the hash value is identical to the data identifier of the map data file being tested, then the map validation component 140 may determine that the map data file is correctly downloaded, and based on determining that the map data file is correct, the map updater component 138 may save the downloaded map data file to the memory 114. If the hash value does not match the respective data identifier, the map data file is not saved to the memory 114, and instead is flagged for re-downloading.

The map validation component 140 may also be used for verifying correctness of the map data files 104 and map manifests 132 already stored in the memory 114 e.g., during periodic checks. In some examples, the map validation component 140 may verify correctness of the map manifests 132 and the map data files 134 when the vehicle 112 is not in operation e.g., overnight, or while stored in a garage, and/or before start of operation. In some examples, the map validation component 140 may verify correctness of a portion of the map manifests 132 and corresponding map data files 134 in a region of operation of the vehicle 112. For example, the portion of the map manifests 132, map data files 134 corresponding to San Francisco may be verified when the vehicle 112 is operating in San Francisco. During verification of a file, the map validation component 140 may generate a hash value by inputting, to the hash function, content of the file. The map validation component 140 may compare the hash value to the respective data identifier of the file, which may be embedded in a filename of the file, as discussed. If the hash value matches the data identifier, then the file is verified to be correct. Processes associated with the components 138, 140 implemented on the vehicle computing system(s) 110 are described further with reference to FIG. 5.

The vehicle computing system(s) 110 may use the map directory 136 to identify and load some or all of the map data files 134 into a working memory for navigation and/or localization of the vehicle 112. In some examples, a subset of the map data files 134 may be accessed, covering a region around a current location of the vehicle. The techniques described herein can improve a functioning of a computing device by providing a framework for efficiently maintaining up-to-date maps in the memory of the computing device. As described, the techniques may determine which files are changed or corrupted, and only transmit or download the affected files. Therefore, the techniques also reduce network usage, and improve speed of operation of file transfers needed to maintain maps, both on network-accessible storage system(s) (e.g., cloud storage) and on on-board memory of vehicles and/or mobile devices.

Figure 2A:
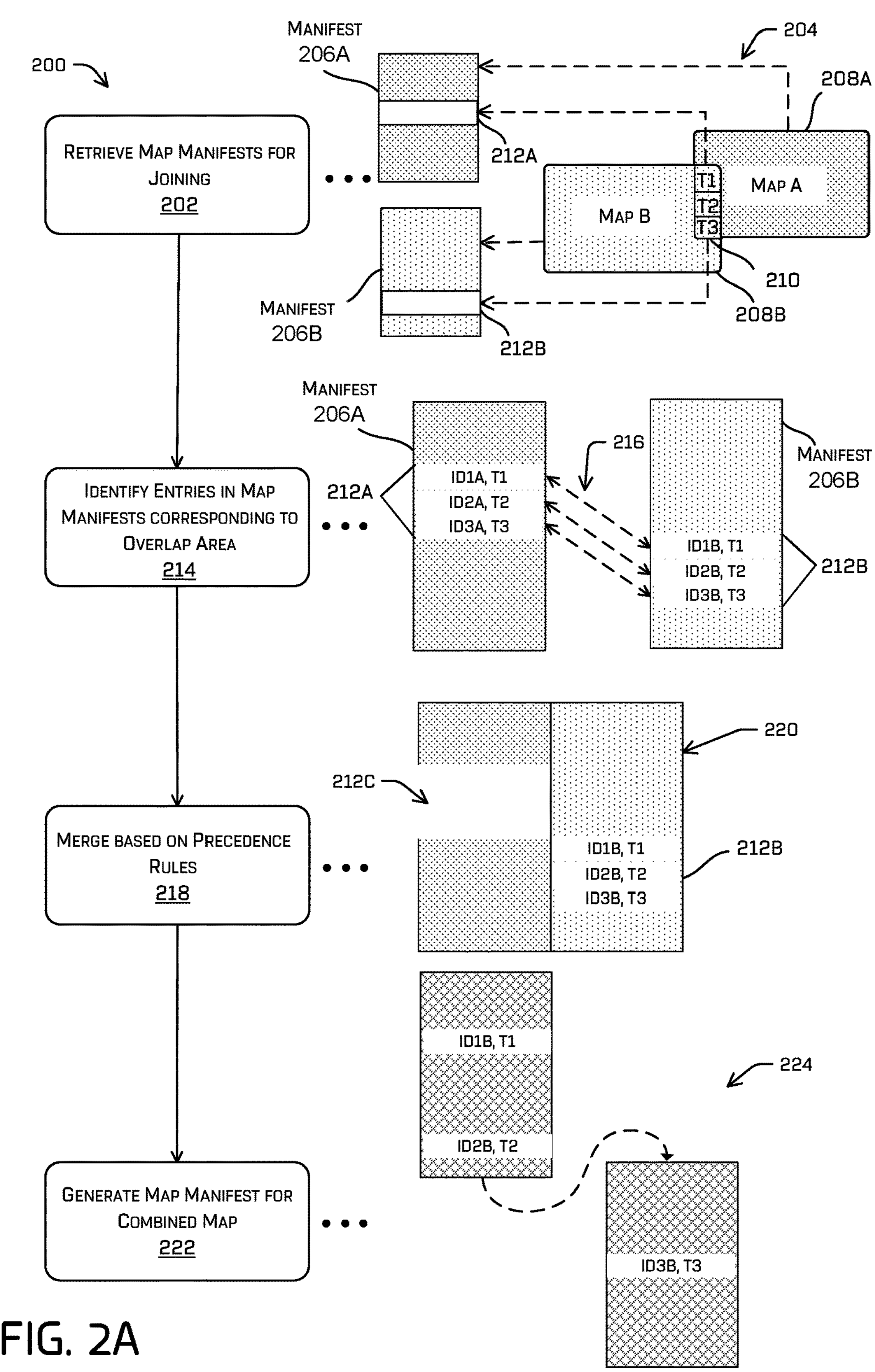
FIG. 2A is a pictorial flow diagram of an example process for combining existing maps to generate a new map.

FIG. 2A is a pictorial flow diagram of an example process 200 for combining existing maps to generate a new map, in accordance with examples of the disclosure. In examples, the process 200 may be implemented on the computing device(s) 108 and/or the vehicle computing system(s) 110.

At operation 202, the process 200 may include retrieving existing map manifests for combining to create a new map. The existing map manifest(s) may be retrieved from memory, such as the storage system(s) 102 or the on-board memory 114 of the vehicle 112, as shown in FIG. 1. In an example 204, map manifest 206A may correspond to a Map A of a first geographic region 208A, and map manifest 206B may correspond to a Map B of a second geographic region 208B overlapping spatially with the first geographic region in a region 210. As discussed, geographic regions may be sub-divided into tiles. As also shown in the example 204, the region 210 may comprise tiles T1, T2, T3. Though shown as two-dimensional squares, tiles may be polygonal in two or three-dimensions (e.g., 3D triangles of a 3D mesh representation of surfaces of the region). In examples, process of tiling of geographic regions may ensure that boundaries between any two maps are smooth or nearly-smooth (e.g., the tiled area T1, T2 or T3 refer to a same underlying geographic area in both Map A and Map B). References to map data associated with the tiles T1, T2, T3 may be present in both the map manifest 206A (at 212A), and the map manifest 206B (at 212B).

At operation 214, the process 200 may include identifying entries in the retrieved map manifests that correspond to a same area (e.g., an overlap area representing a same underlying geographic region). Continuing with the example 204, the references to the map data associated with the tiles T1, T2, T3 may be identified by file identifiers 124, as described with reference to FIG. 1. In the example 204 shown, the file identifiers 212A may include entries (ID1A, T1), (ID2A, T2), and (ID3A, T3), where the entries contain a first portion (ID1A, ID2A, ID3A) corresponding to data identifiers of the map data files being referenced, and a second portion listing the tile identifiers T1, T21, T3 tile identifier indicating the respective tiles. Similarly, the file identifiers 212B may include entries (ID1B, T1), (ID2B, T2), and (ID3B, T3), where ID1B, ID2B, and ID3B correspond to data identifiers of the associated map data files. The process 200 may determine a match 216 between the tile identifiers in the file identifiers 212A, 212B. Though a single entry is shown for each tile T1, T2, T3, as described with reference to FIG. 1, each tile T1, T2, T3 may be associated with a plurality of map data files, with various types of content. Though the references to the map data associated with the tiles T1, T2, T3 are shown as a contiguous block 212A, 212B for ease of illustration, in examples, individual references may be in non-contiguous locations in the map manifests 206A, 206B.

At operation 218, the process 200 may merge the two map manifests 206A, 206B based on precedence rules. In examples, entries associated with non-overlapping regions (e.g., tiles other than T1, T2, and T3) of the map manifests 206A, 206B may be included in a joined file 220 without change. The precedence rules may be applied to the file identifiers 212A, 212B from the tiles T1, T2, T3 of the overlapping region 210. As non-limiting examples, the precedence may be based on timestamp of the associated map data files (e.g., a more recent map data file may have precedence over an earlier map data file), level of detail and/or accuracy of the associated map data files (e.g., a higher resolution and/or a higher accuracy may have higher precedence), sensor used to capture the map data (e.g., data captured using a more advanced version of a sensor may have higher precedence), and the like. At the operation 218, the file identifiers referencing map data files in the overlap region 210 may be replaced with entries which have higher precedence between the two map manifests 206A, 206B. In the example 204 shown, based on the entries in 212B having a higher precedence, the file identifiers 212A may be removed from the joined file 220, as indicated by void 212C, while the file identifiers 212B may be retained. In this scenario, in the joined file 220, the data identifiers associated with the tile identifiers T1, T2, and T3 would point to respective map data files referenced in the map manifest 206B.

At the operation 222, the process 200 may generate a map manifest 224 of the combined geographic region (a combination of Map A and Map B), as indicated by the joined file 220. The process 200 may sort the entries in the joined file 220 (e.g., by alphanumeric ordering) to produce a consistent ordering, to generate the map manifest 224, which is shown as connected blocks solely for ease of illustration. In addition, at the operation 222, the process 200 may determine a manifest identifier for the map manifest 224 by inputting to a hash function, content of the map manifest 224 file. As described, a filename or URI of the map manifest 224 file may include its manifest identifier, which also indicates a mapping to a physical storage location where the file containing the map manifest 224 will be located in a storage system (such as the storage system(s) 102).

Figures 2B, 2C, 2D:
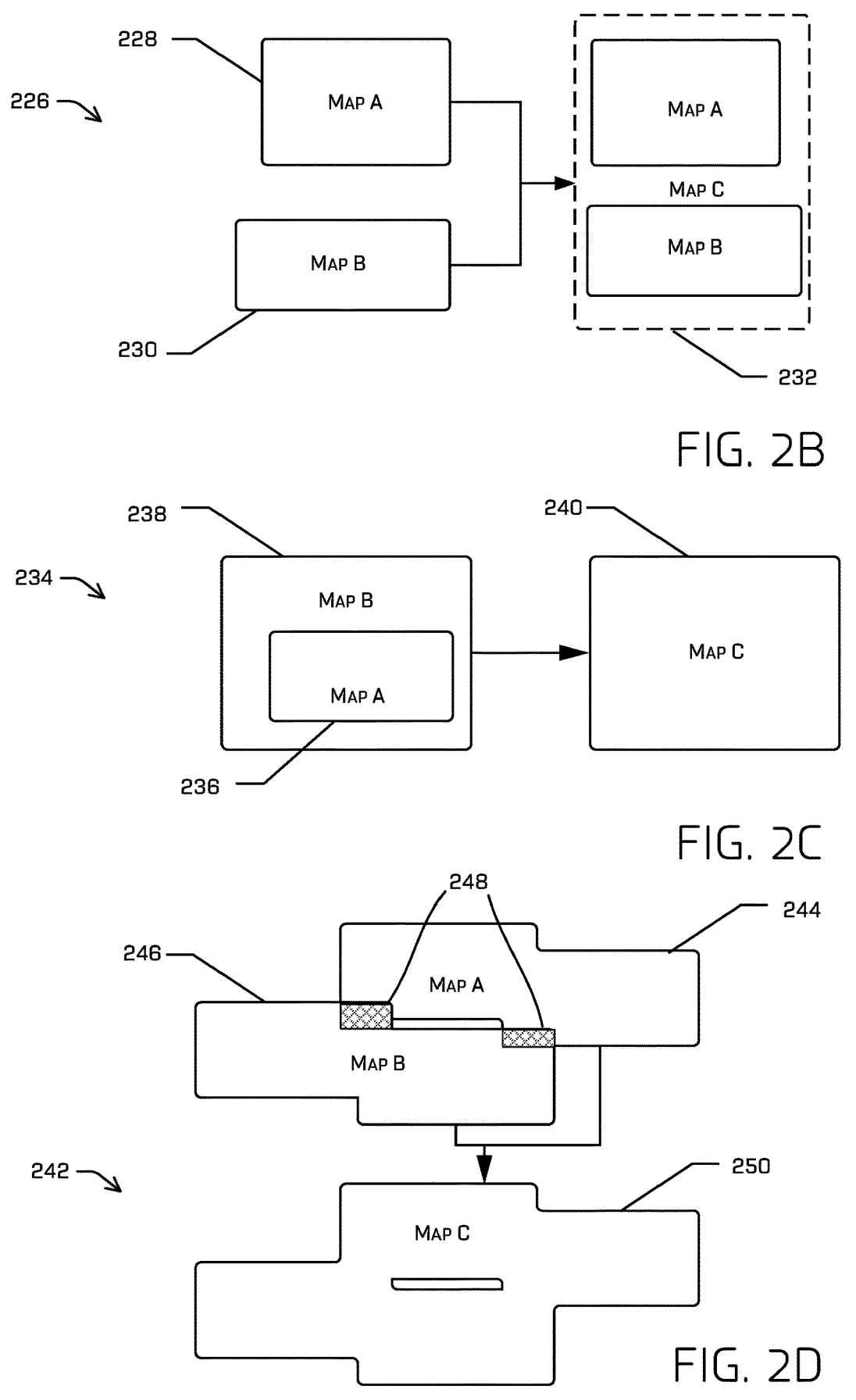

The process 200 may be applied for joining map manifests to generate a map manifest of a combined geographic area in example scenarios other than the example 204 illustrated in FIG. 2. Additional, non-limiting examples are illustrated in FIGS. 2B-2D.

FIG. 2B illustrates an example 226 where the maps to be combined, Map A of a first geographic region 228 and Map B of a second geographic region 230, are disjoint (no overlap). In the example 226, a map manifest of a combined map 232 would include all entries of map manifest of Map A and all entries of map manifest of Map B.

FIG. 2C illustrates an example 234 where a first geographic region 236 is completely enclosed by a second geographic region 238, and Map A of the region 236 has higher priority (or precedence) than Map B of the region 238. In the example 234, a map manifest of a combined map 240 would include entries of map manifest of Map B (corresponding to the enclosing region 238), where entries associated with tiles in the region 236 are replaced by corresponding entries from a map manifest of Map A.

FIG. 2D illustrates an example 242 where a first region 244 represented by Map A and a second region 246 represented by Map B, are each combinations of other maps. For example, Map A (or Map B) may be a combined map represented by the map manifest 224 of the example 204. In the example 242, tiles corresponding to overlap regions 248 may be merged based on precedence rules, as described at the operation 218. A map manifest of a combined region 250 represented by Map C may include entries from map manifests of Map A and Map B, with tiles in the overlap regions 248 being associated with map data files (either from Map A or Map B) with higher precedence.

Figure 3:
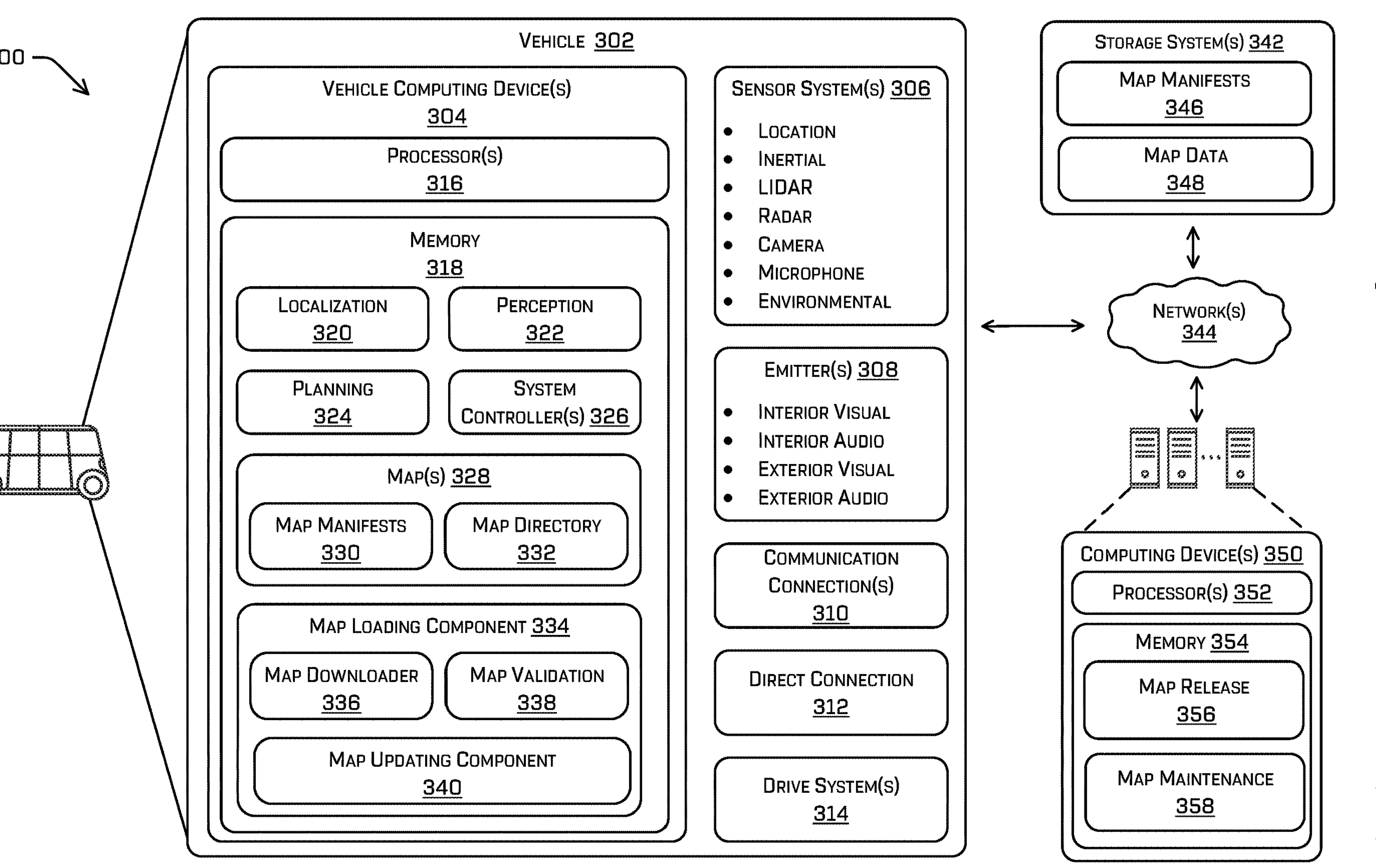
FIG. 3 depicts a block diagram of an example system for implementing the techniques described herein.

FIG. 3 depicts a block diagram of an example system 300 for implementing the techniques described herein. In at least one example, the system 300 can include a vehicle 302, which can correspond to the vehicle 112 in FIG. 1.

The vehicle 302 can include a vehicle computing device 304, one or more sensor systems 306, one or more emitters 308, one or more communication connections 310, at least one direct connection 312, and one or more drive system(s) 314.

The vehicle computing device 304 can include one or more processors 316 and memory 318 communicatively coupled with the one or more processors 316. In the illustrated example, the vehicle 302 is an autonomous vehicle;

however, the vehicle 302 could be any other type of vehicle, or any other system having at least an image capture device (e.g., a camera enabled smartphone). In the illustrated example, the memory 318 of the vehicle computing device 304 stores a localization component 320, a perception component 322, a planning component 324, one or more system controllers 326, one or more maps 328 including map manifests 330 and map directory 332, and a map loading component 334 including a map downloader component 336, a map validation component 338, and a map updating component 340. Though depicted in FIG. 3 as residing in the memory 318 for illustrative purposes, it is contemplated that the localization component 320, the perception component 322, the planning component 324, the one or more system controllers 326, the map(s) 328, and the map loading component 334 can additionally, or alternatively, be accessible to the vehicle 302 (e.g., stored on, or otherwise accessible by, memory remote from the vehicle 302).

In at least one example, the localization component 320 can include functionality to receive data from the sensor system(s) 306 to determine a position and/or orientation of the vehicle 302 (e.g., one or more of an x-, y-, z-position, roll, pitch, or yaw). For example, the localization component 320 can include and/or request/receive a map of an environment and can continuously determine a location and/or orientation of the autonomous vehicle within the map. In some instances, the localization component 320 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 320 can provide data to various components of the vehicle 302 to determine an initial position of an autonomous vehicle for generating a trajectory and/or for determining to load map data into memory, as discussed herein.

In some instances, the perception component 322 can include functionality to perform object detection, segmentation, and/or classification. In some examples, the perception component 322 can provide processed sensor data that indicates a presence of an entity that is proximate to the vehicle 302 and/or a classification of the entity as an entity type (e.g., car, pedestrian, cyclist, animal, building, tree, road surface, curb, sidewalk, unknown, etc.). In additional or alternative examples, the perception component 322 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 324 can determine a path for the vehicle 302 to follow to traverse through an environment. For example, the planning component 324 can determine various routes and trajectories and various levels of detail. For example, the planning component 324 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 324 can generate an instruction for guiding the autonomous vehicle along at least a portion of the route from the first location to the second location. In at least one example, the planning component 324 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 302 to navigate.

In some instances, the planning component 324 can include a prediction component to generate predicted trajectories of objects in an environment. For example, a prediction component can generate one or more predicted trajectories for vehicles, pedestrians, animals, and the like within a threshold distance from the vehicle 302. In some instances, a prediction component can measure a trace of an object and generate a trajectory for the object based on observed and predicted behavior.

In at least one example, the vehicle computing device 304 can include one or more system controllers 326, which can be configured to control steering, propulsion, braking, safety, emitters, communication, and other systems of the vehicle 302. These system controller(s) 326 can communicate with and/or control corresponding systems of the drive system(s) 314 and/or other components of the vehicle 302.

The memory 318 can further include one or more maps 328 that can be used by the vehicle 302 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the map(s) 328 can include at least one map (e.g., images and/or a mesh). In some examples, the vehicle 302 can be controlled based at least in part on the map(s) 328. That is, the map(s) 328 can be used in connection with the localization component 320, the perception component 322, and/or the planning component 324 to determine a location of the vehicle 302, identify objects in an environment, and/or generate routes and/or trajectories to navigate within an environment.

In some examples, the map(s) 328 can include map manifests 330 and a map directory 332 comprising a hierarchical directory structure containing pointers to map data files. As described with reference to FIG. 1, each map manifest of the map manifests 330 identifies a single map, and contains a complete listing complete listing of all content files for the map, providing necessary information (e.g., storage locations of included map data files and map manifests) for downloading the map (e.g., by a vehicle computing system). A map manifest of the map manifests 330 may include tile identifiers associated with each map data file, where the tile identifiers indicate a path or location in the directory where the map data file is stored. Upon downloading a map data file, the map data file may be stored in the location in the map directory 332 as indicated by its associated tile identifier.

The map loading component 334 can include a map downloader component 336, a map validation component 338, and a map updating component 340. In examples, the map downloader component 336 may implement functionality of the map updater component 138, determining maps that need to be downloaded and downloading such maps from a remote storage system(s) 342 accessible via network(s) 344. The storage system(s) 342 may be the storage system(s) 102. The map downloader component 336 may download map manifests 346 from the storage system(s) 342, and determine, based on comparing content-based hash values corresponding to the map manifests 330 and the map manifests 346, if there is a change. If a change is determined, the map downloader component 336 may identify files, such as map data files 348, that have changed by traversing the entries of the map manifest 346 recursively in a top-down order, and comparing respective content-based hash values of files at the storage system(s) 342 and corresponding files in the memory 318. The map validation component 338 may implement the functionality of the map validation 140 to ensure that files containing the map manifests 346 and the map data 348 are downloaded and stored accurately at the memory 318. In addition, the map loading component 334 may include a map updating component 340 implementing functionality of the map maintenance component 130 for generating new maps by combining the map manifests 330 already stored on the memory 318 (e.g., using the process 200).

As can be understood, the components discussed herein (e.g., the localization component 320, the perception component 322, the planning component 324, the one or more system controllers 326, the map(s) 328, and the map loading component 334, are described as divided for illustrative purposes. However, the operations performed by the various components can be combined or performed in any other component.

In some examples, the map manifests 346 and the map data 348 may be stored on the storage system(s) 342 by a remote computing device(s) (such as computing device(s) 350) accessing the storage system(s) 342 via the network(s) 344. The computing device(s) 350 can include processor(s) 352 and a memory 354 storing a map release component 356 and a map maintenance component 358. In examples, the map release component 356 may correspond to the map release component 120, and the map maintenance component 358 may correspond to the map maintenance component 130, and implement similar functionality. In some instances, the map release component 356 can include functionality to generate maps, each map being associated with a map manifest of the map manifests 346, and associate semantic information and metadata with such maps.

In at least one example, the sensor system(s) 306 can include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 306 can include multiple instances of each of these or other types of sensors. For instance, the LIDAR sensors can include individual LIDAR sensors located at the corners, front, back, sides, and/or top of the vehicle 302. As another example, the camera sensors can include multiple cameras disposed at various locations about the exterior and/or interior of the vehicle 302. The sensor system(s) 306 can provide input to the vehicle computing device 304. Additionally or alternatively, the sensor system(s) 306 can send sensor data, via the one or more networks 344, to the one or more computing device(s) at a particular frequency, after a lapse of a predetermined period of time, in near real-time, etc.

The vehicle 302 can also include one or more emitters 308 for emitting light and/or sound, as described above. The emitters 308 in this example include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 302 can also include one or more communication connection(s) 310 that enable communication between the vehicle 302 and one or more other local or remote computing device(s). For instance, the communication connection(s) 310 can facilitate communication with other local computing device(s) on the vehicle 302 and/or the drive system(s) 314. Also, the communication connection(s) 310 can allow the vehicle to communicate with other nearby computing device(s) (e.g., other nearby vehicles, traffic signals, etc.). The communications connection(s) 310 also enable the vehicle 302 to communicate with a remote teleoperations computing device or other remote services.

The communications connection(s) 310 can include physical and/or logical interfaces for connecting the vehicle computing device 304 to another computing device or a network, such as network(s) 344. For example, the communications connection(s) 310 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 302 can include one or more drive systems 314. In some examples, the vehicle 302 can have a single drive system 314. In at least one example, if the vehicle 302 has multiple drive systems 314, individual drive systems 314 can be positioned on opposite ends of the vehicle 302 (e.g., the front and the rear, etc.). In at least one example, the drive system(s) 314 can include one or more sensor systems to detect conditions of the drive system(s) 314 and/or the surroundings of the vehicle 302. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, LIDAR sensors, radar sensors, etc. Some sensors, such as the wheel encoders can be unique to the drive system(s) 314. In some cases, the sensor system(s) on the drive system(s) 314 can overlap or supplement corresponding systems of the vehicle 302 (e.g., sensor system(s) 306).

The drive system(s) 314 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 314 can include a drive system controller which can receive and preprocess data from the sensor system(s) and to control operation of the various vehicle systems. In some examples, the drive system controller can include one or more processors and memory communicatively coupled with the one or more processors. The memory can store one or more systems to perform various functionalities of the drive system(s) 314. Furthermore, the drive system(s) 314 also include one or more communication connection(s) that enable communication by the respective drive system with one or more other local or remote computing device(s).

In at least one example, the direct connection 312 can provide a physical interface to couple the one or more drive system(s) 314 with the body of the vehicle 302. For example, the direct connection 312 can allow the transfer of energy, fluids, air, data, etc. between the drive system(s) 314 and the vehicle. In some instances, the direct connection 312 can further releasably secure the drive system(s) 314 to the body of the vehicle 302.

The processor(s) 316 of the vehicle 302 and the processor(s) 352 of the computing device(s) 350 can be any suitable processor capable of executing instructions to process data and perform operations as described herein. By way of example and not limitation, the processor(s) 316 and 352 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 318 and 354 are examples of non-transitory computer-readable media. The memory 318 and 354 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, the memory 318 and 354 can include at least a working memory and a storage memory. For example, the working memory may be a high-speed memory of limited capacity (e.g., cache memory) that is used for storing data to be operated on by the processor(s) 316 and 352. In some instances, the memory 318 and 354 can include a storage memory that may be a lower-speed memory of relatively large capacity that is used for long-term storage of data, and/or include backup storage (e.g., tape storage, external hard drive, etc.). In some cases, the processor(s) 316 and 352 cannot operate directly on data that is stored in the storage memory, and data may need to be loaded into a working memory for performing operations based on the data, as discussed herein.

In some instances, aspects of some or all of the components discussed herein can include any models, algorithms, and/or machine learning algorithms. For example, in some instances, the components in the memory 318 and the memory 354, can be implemented as a neural network.

As described herein, an exemplary neural network passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

It should be noted that while FIG. 3 is illustrated as a distributed system, in alternative examples, components of the vehicle 302 can be associated with the computing device(s) 350 and/or components of the computing device(s) 350 can be associated with the vehicle 302. That is, the vehicle 302 can perform one or more of the functions associated with the computing device(s) 350, and vice versa.

Figure 4:
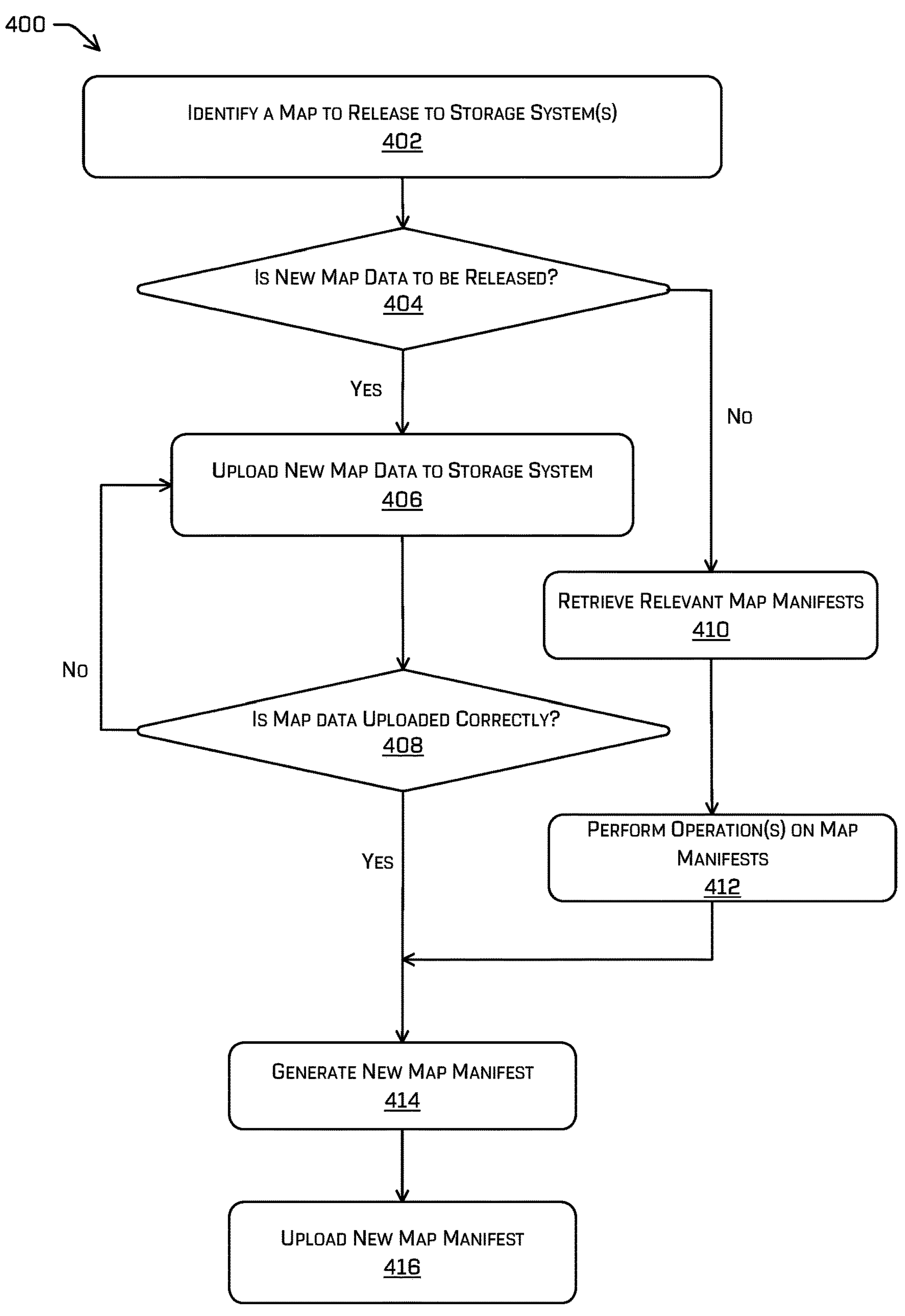
FIG. 4 depicts an example process for releasing a map and associated map data to a storage system, in accordance with examples of the disclosure.
Figure 5:
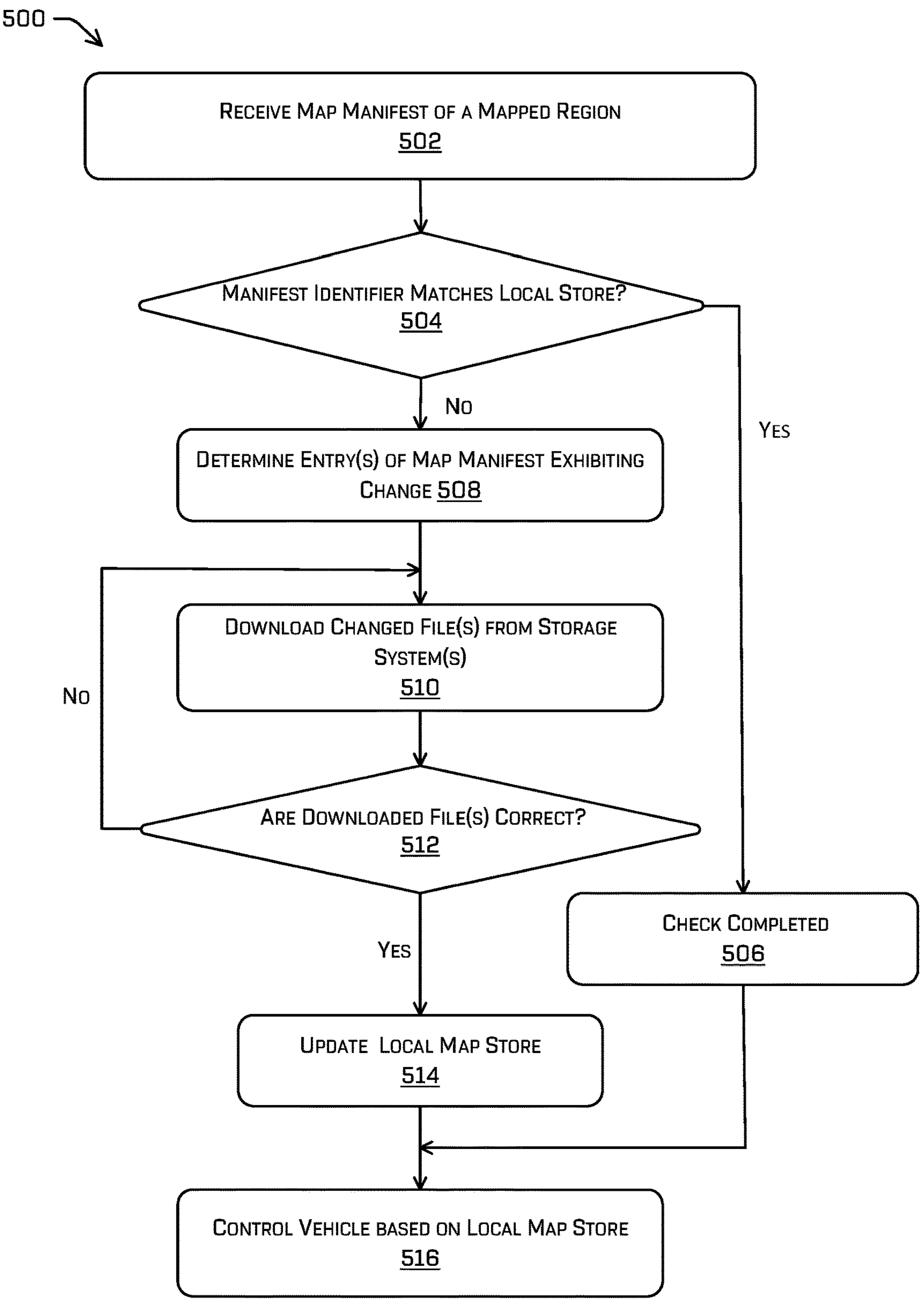
FIG. 5 depicts an example process for downloading map data from a remote storage system to a local memory, in accordance with examples of the disclosure.

FIGS. 4 and 5 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 4 depicts an example process 400 for releasing a map for use by a vehicle for navigation and localization while traversing a region of an environment, in accordance with examples of the disclosure. For example, some or all of the process 400 can be performed by one or more components in FIG. 1 or 3, as described herein. For example, some or all of the process 400 can be performed by the map release components 120, 356 and/or map maintenance and updater component(s) 130, 340.

At operation 402, the process 400 may include identifying a map to release to storage system(s). The storage system(s) may comprise network-accessible memory (e.g., cloud storage), and/or memory on-board a vehicle (e.g., the memory 114, 318). A map identified for release may represent a new geographic area being mapped, a new geofence being created, a geographic area or geofenced region being remapped or expanded, and the like. The map may also be identified for release when new map data is being added to an existing map (e.g., at a higher resolution, incorporating updates due to changes in the region, due to the existing map being older than a threshold period of time, etc.).

At operation 404, the process 400 may include identifying if new map data is to be released, requiring upload of corresponding map data file(s) to the storage system(s). If new map data is to be released (at 404—Yes), the process 400, at an operation 406 may upload the new map data file(s) to the storage system(s). For each new map data file(s), a hash value (e.g., a SHA-256 hash) may be computed, and assigned as a filename or URI of the respective map data file.

In examples, the map data file(s) may be uploaded individually, or in small batches, the process 400, at an operation 408, checking if the map data file(s) have been correctly uploaded after each upload. For example, at the operation 408, the process 400 may compare a first value (or "checksum") based on content of the map data file(s), and verify that a second value based on content of the uploaded map data file at the storage system(s) 102 matches the first value. As an example, a first MD5 checksum may be computed at a point of transmission of the map data file(s) to the storage system(s) 102, and the process 400 may determine that a map data file was uploaded correctly if a second MD5 checksum returned by the storage system(s) 102 matches the first MD5 checksum. In either example, if a mismatch is determined, indicating that the map data was not uploaded correctly (at 408—No), the process 400 may repeat the upload at the operation 406.

Alternatively, if at the operation 404, no new map data is to be released (at 404—No), indicating that the map release comprises operations on existing map manifests, the process 400, at an operation 410, may retrieve relevant map manifest(s) that are related to the map to be released (e.g., map manifests of two or more maps to be joined).

At operation 412, the process 400 may perform operations on the retrieved map manifests at operation 410. As described with reference to FIG. 2A, two maps may be joined to generate a combined map by identifying portion(s) of the corresponding map manifests that overlap a same region (e.g., same tiles) of a geographic region, and selecting the map manifest entries with higher priority based on precedence rule(s). In examples, the higher priority of the entries may be based on being more recent, more detailed (e.g., at a higher resolution), more advanced version of sensor used in capturing the data, higher accuracy, and the like).

At operation 414, the process 400 may generate a new map manifest corresponding to the map being released, after completion of correct upload of map data (at 408—Yes) or from existing map manifests (operation 412). The new map manifest may identify associated map data files by its data identifier based on content, and a tile identifier that the map data file is associated with, as shown in FIG. 1 (file identifier 124). As also discussed with reference to FIG. 1, the new map manifest may also include manifest identifiers corresponding to map manifests for sub-regions of the geographic region covered by the map being released, or manifest identifiers for sub-manifests created to reduce a size of a top-level map manifest. In examples, the process 400 may generate the new map manifest using a recursive process, starting with sub-manifest(s) at a lowest level of a map manifest tree structure e.g., a sub-manifest containing entries corresponding to map data files only, and not including entries corresponding to other map manifests.

At operation 416, the process 400 may upload the new map manifest to the storage system(s). The new map manifest includes a complete listing of all content files for the map, providing necessary information (e.g., storage locations of included map data files and map manifests) for downloading the map (e.g., by a vehicle computing system). In examples, the operation 416 may be repeated recursively for map manifests exhibiting a hierarchical structure e.g., sub-manifest(s) may be released from bottom-to-top e.g., from a lowest level of the hierarchy (containing map data files), to the top level, and each upload may be verified for accurate upload before a higher level map manifest is uploaded. In such examples, correctness of upload may be verified using techniques similar to those described at the operation 408. For example, a first MD5 checksum of a map manifest file may be computed at a point of transmission of the file to the storage system(s) 102, and the process 400 may determine that the map manifest file was uploaded correctly if a second MD5 checksum returned by the storage system(s) 102 matches the first MD5 checksum.

FIG. 5 depicts an example process 500 for downloading a map (e.g., by a vehicle), represented by a map manifest, from a storage system(s), in accordance with examples of the disclosure. For example, some or all of the process 500 may be performed by one or more components shown in FIG. 1 or 3, as described herein. For example, some or all of the process 500 can be performed by the map updater 138 and map validation 140 components implemented by vehicle computing system(s) 110, or the map loading component 334. In examples, the process 500 can be performed by an autonomous vehicle or a non-autonomous vehicle, by a sensor system, or by a robotic platform, to access maps required for navigation and/or localization in an environment of operation.

At operation 502, the process 500 may include receiving a map manifest of a mapped region. In some examples, the mapped region may be identified by a name (e.g., San Francisco, zone 45), coordinates, or other unique identifier, and the map manifest corresponding to the mapped region may be retrieved from the file association 118 of the storage system(s) 102. If the mapped region is new (e.g., does not already exist in a local map store), then the process 500 may download the associated map to the local map store. If the local map store already stores a map corresponding to the mapped region, the process 500 may check the map manifest for potential changes requiring updates to the local map store. In some examples, a mapped region may be checked for updates to associated maps periodically, or after elapse of a threshold period of time. In other examples, maps may be updated in response to a known change in the environment (e.g., construction work on roads, new traffic patterns, etc.), in response to a notification.

At operation 504, the process 500 may include determining whether a manifest identifier corresponding to the map manifest received at the operation 502 matches an existing manifest identifier in local store (e.g., an on-board memory of a vehicle) for a map manifest associated with the mapped region. In examples, the process 500 may receive the manifest identifier along with the map manifest. In other examples, the process 500 may determine the manifest identifier of the received map manifest by inputting content of a file containing the map manifest to a hash function, to generate a hash value as the manifest identifier. In some examples, the hash function may be a cryptographic hash function, such as Secure Hash Algorithm (SHA)-256 or SHA-512. If the manifest identifier of the received map manifest is identical to the existing map manifest for the mapped region in the local store, then there is no change in the map (at 504—Yes), and at an operation 506, the map manifest check is determined to be completed (e.g., the local map associated with the mapped region does not need to be updated).

If the manifest identifier of the received map manifest does not match the existing manifest identifier for the mapped region in the local store (at 504—No), then, at operation 508, the process 500 may determine entry(ies) of the received map manifest exhibiting a difference with the existing map manifest in the local store. The differences may be determined recursively by following links to map manifests referenced in the received map manifest, as discussed. Changes may be detected by comparing data identifiers of map data files, and manifest identifiers of map manifests referenced, with corresponding entries in the existing map manifest e.g., a mismatch indicates a change. In some examples, a difference between files may be computed based on a representation of the content of the files (e.g., an embedding, a transformation, a projection on a lower or higher dimensional space, etc.), and allow a non-binary determination of difference (e.g., the difference value may be proportional to a degree of difference in content). In such examples, the difference value may be compared with a threshold to determine if a file has changed (e.g., a difference value higher than the threshold indicates that there is a change). In some instances, the threshold may be based on requirements of an operation that will utilize the file as input. For example, localization operations may require less accuracy than trajectory determination, and therefore, the threshold may be set higher if the file is to be used for localization than if the file is to be utilized for trajectory determination.

At operation 510, the process 500 may include downloading files corresponding to entries that exhibit a change at the operation 508. As described with reference to FIG. 1, data identifiers corresponding to the map data files also indicate a storage location where the respective map data file is stored on the storage system(s). The process 500 may download the changed map data files from the storage location indicated by the respective data identifier. Similarly, changed map manifests may be downloaded from storage locations indicated by corresponding manifest identifiers. In some examples, the data identifier or manifest identifier may be a filename (or incorporated into the filename) of the respective map data file or map manifest file, as described earlier.

At operation 512, the process 500 may verify that the downloaded file(s) are correct. For example, the process 500 may compare a hash value (or a checksum) based on content of a downloaded file (which may be a map data file or a map manifest), and verify that the hash value or checksum matches the data identifier or manifest identifier included in the filename of the downloaded file. If there is mismatch, the process 500 may determine that the file has not been downloaded correctly (at 512—No), and the operation 510 may be repeated to re-download the file that is determined to be incorrect.

At operation 514, the process 500 may update the local map store by storing the downloaded file(s) in appropriate location(s). In some examples, the local map store may maintain a hierarchical map directory, and the downloaded file(s) may be stored in locations in the map directory structure based on information in tile identifiers of the received map manifest, as described with reference to FIG. 1. Local map manifests that reference the changed file(s) may be updated to reference or point to the downloaded file(s). In some examples, the local map store may maintain a mapping between names of mapped regions and location of associated files in the map directory structure.

At operation 516, the process 500 may control the vehicle based on maps stored in the local map store. Various vehicle systems may use the stored maps. For example, a localization system of the vehicle may request and/or retrieve a map of an environment it is traversing, and can continuously determine a location and/or orientation of the autonomous vehicle within the map using techniques such as SLAM (simultaneous localization and mapping), CLAMS (calibration, localization and mapping, simultaneously), relative SLAM, or the like. As another example, planning systems of the vehicle may determine a route to a destination point and/or local trajectory of the vehicle in an immediate environment surrounding the vehicle, based on maps retrieved from the local map store.

Example Clauses

A: An example system comprising: one or more processors; a memory; and one or more non-transitory computer-readable media storing instructions executable by the one or more processors, wherein the instructions, when executed, cause the system to perform operations comprising: receiving a map manifest representing a map of a region, the map manifest including an entry, wherein the entry includes a first identifier comprising a first hash value indicative of first content of a first map data file associated with a first tile identifier; accessing, from the memory, an existing second identifier comprising a second hash value indicative of second content of a second map data file associated with the first tile identifier; determining, based on the first identifier not matching the second identifier, a change associated with the first tile identifier; based on determining the change, retrieving, from a storage location identified by the map manifest, the first content of the first map data file to a third map data file in the memory; identifying, from the memory, a second tile identifier, different from the first tile identifier, associated with the second identifier; associating the first tile identifier and the second tile identifier with the third map data file; and controlling, based at least in part on the third map data file, an autonomous vehicle to traverse the region.

B: The system of example A, wherein: a filename associated with the first map data file includes the first identifier, and the storage location is identified based at least in part on the filename.

C: The system of example A or example B, wherein retrieving the first map data file further comprises: determining, based on the first content, a first checksum; determining, based on a third content of the first map data file as retrieved at a first time, a second checksum; and based on determining that the first checksum does not match the second checksum, retrieving the first map data file at a second time after the first time.

D: The system of any one of example A through example C, wherein the first tile identifier is indicative of a polygon of a three-dimensional mesh representation of the region, a cell of a two-dimensional tile representation of the region, or a path of a hierarchical directory structure.

E: The system of any one of example A through example D, wherein the map is a first map of a first region, and the map manifest is a first map manifest representing the first map, the operations further comprising: accessing, from the memory, a second map manifest representing a second map of a second region, the second map manifest including one or more tile identifiers matching one or more tile identifiers of the first map manifest; and generating, based on the second map manifest and the first map manifest, a third map manifest representing a third map, the third map being associated with a combination of the first region and the second region.

F: The system of any one of example A through example E, wherein the memory is on-board the autonomous vehicle, and controlling the autonomous vehicle further comprises: performing an action of the autonomous vehicle based at least in part on the first content, wherein the action includes at least one of: a localization action to determine a position of the autonomous vehicle in the region, or a planning action to determine a trajectory of the autonomous vehicle for traversing the region.

G: An example method comprising: receiving a map manifest associated with a region, the map manifest including an entry, wherein the entry includes a first identifier based on first content of a first data file, the first data file associated with a first portion of the region; determining, based on comparing the first identifier with a second identifier generated based on second content of a second data file associated with the first portion of the region, a change; based on determining the change, retrieving, from a storage location associated with the first identifier, the first content of the first data file to a third data file; and associating the first portion of the region with the third data file.

H: The method of claim G, wherein the first data file contains map data representing the first portion of the region, the method further comprising: performing an action of a vehicle based at least in part on the map data, wherein the action includes at least one of a localization action or a planning action.

I: The method of example G or example H, wherein the map data comprises at least one of: three-dimensional mesh data, two-dimensional tile data, intensity data, road network data, radio-frequency (RF) data, or altitude data.

J: The method of any of example G through example I, wherein the first data file contains three-dimensional mesh data, and the first identifier is determined by providing, as input, the three-dimensional mesh data to a hash function, and receiving, as output, the first identifier.

K: The method of any of example G through example J, wherein the first data file contains two-dimensional tile data, and the first identifier is determined by providing, as input, the two-dimensional tile data to a hash function.

L: The method of any of example G through example K, wherein the map manifest is a first map manifest, and the first data file contains a second map manifest associated with a second portion of the first portion of the region.

M: The method of any of example G through example L, wherein the map manifest is a first map manifest and the region is a first region, the method further comprising: receiving a second map manifest associated with a second region; and determining, based on the first map manifest and the second map manifest, a third map manifest associated with a third region combining the first region and the second region, wherein the third map manifest is determined without accessing the first content of the first data file.

N: The method of any of example G through example M, wherein: a Universal Resource Identifier (URI) indicative of a storage location associated with the first data file includes the first identifier, and the storage location is identified based at least in part on the URI.

O: The method of any of example G through example N, further comprising: determining, by inputting content of the third data file to a hash function, a third identifier; determining that the third identifier matches the first identifier; and based on determining that the third identifier matches the first identifier, validating an accuracy of the third data file.

P: An example one or more non-transitory computer-readable media storing instructions executable by a processor, wherein the instructions, when executed, cause the processor to perform operations comprising: receiving first map metadata associated with a region of an environment, the first map metadata including one or more first hash values indicative of content of respective data files associated with the region; determining, based on comparing the one or more first hash values with one or more second hash values in a second map metadata file associated with the region, a change in content of a data file associated with the one or more second hash values; and updating, based on determining the change, an association between the region and the data file.

Q: The one or more non-transitory computer-readable media of example P, wherein the data file is associated with a first tile of the region, the operations further comprising: determining, a third hash value of the one or more second hash values matching a hash value associated with the data file, the third hash value associated with a second tile of the region; and associating the second tile with the data file.

R: The one or more non-transitory computer-readable media of example P or example Q, wherein the third hash value is a based on Secure Hash Algorithm (SHA), and a Universal Resource Identifier (URI) of the data file includes the third hash value.

S: The one or more non-transitory computer-readable media of example P through example R, wherein the data file contains one of: geospatial tile data, road network data, intensity data, or altitude data.

T: The one or more non-transitory computer-readable media of example P through example S, wherein the first map metadata is associated with a first region, the operations further comprising: accessing a second map metadata associated with a second region; and determining, based on the first map metadata and the second map metadata, a third map metadata associated with a third region, the third region being a combination of the first region and the second region.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:

one or more processors;

a memory; and one or more non-transitory computer-readable media storing instructions executable by the one or more processors, wherein the instructions, when executed, cause the system to perform operations comprising:

receiving a map manifest representing a map of a first geographic region comprising geospatial tiles, wherein the map manifest includes a first identifier comprising a first hash value indicative of first content of a first map data file associated with a tile of the geospatial tiles;

accessing, from the memory, a second identifier comprising a second hash value indicative of second content of a second map data file associated with the tile;

determining, based on the first identifier not matching the second identifier, a change in map data associated with the tile;

identifying, based at least in part on a textual representation of the first identifier, a storage location of the first map data file, wherein a filename of the storage location includes the textual representation;

based on determining the change, retrieving, from the storage location, the first content of the first map data file to a third map data file in the memory, the third map data file storing the first content;

associating the tile with the third map data file;

receiving an additional map manifest associated with a second geographic region;

determining, based on the map manifest and the additional map manifest, a third map manifest associated with a third geographic region comprising the first geographic region and the second geographic region, wherein the third map manifest is determined without accessing the first content of the first map data file or the first content of the third map data file; and controlling, based at least in part on the third map manifest, an autonomous vehicle to traverse the third geographic region.

2. The system of claim 1, wherein retrieving the first map data file further comprises:

determining, based on the first content, a first checksum;

determining, based on a third content of the first map data file as retrieved at a first time, a second checksum;

determining that the first checksum does not match the second checksum; and based on determining that the first checksum does not match the second checksum, retrieving the first map data file at a second time after the first time.

3. The system of claim 1, wherein the tile corresponds to a polygon of a three-dimensional mesh representation of the first geographic region or a cell of a two-dimensional tile representation of the first geographic region.

4. The system of claim 1, wherein the map manifest is a first map manifest and the map is a first map comprising first geospatial tiles, the operations further comprising:

accessing, from the memory, a second map manifest representing a second map of a fourth geographic region, the fourth geographic region including one or more tiles of the first geospatial tiles; and generating, based on the second map manifest and the first map manifest, a fourth map manifest representing a combination of the first geographic region and the fourth geographic region.

5. The system of claim 1, wherein the memory is on-board the autonomous vehicle, and controlling the autonomous vehicle further comprises:

performing an action of the autonomous vehicle based at least in part on the first content, wherein the action includes at least one of:

a localization action to determine a position of the autonomous vehicle in the third geographic region, or a planning action to determine a trajectory of the autonomous vehicle for traversing the third geographic region.

6. A method comprising:

receiving a first map manifest associated with a geographic region, wherein the first map manifest includes a first identifier comprising a hash value determined by providing, as input to a hash function, first content of a first data file associated with a first portion of the geographic region;

determining, based on comparing the first identifier with a second identifier generated based on second content of a second data file associated with the first portion of the geographic region, a change in map data associated with the first portion of the geographic region;

identifying, based at least in part on a first textual representation of the first identifier, a storage location of the first data file, wherein a second textual representation of a Universal Resource Identifier (URI) of the storage location includes the first textual representation;

based on determining the change, retrieving, from the storage location associated with the first identifier, the first content of the first data file to a third data file, the third data file storing the first content;

associating the first portion of the geographic region with the third data file;

receiving a second map manifest associated with a second portion of the geographic region; and determining, based on the first map manifest and the second map manifest, and without accessing the first content, a third map manifest associated with a third portion of the geographic region comprising the first portion of the geographic region and the second portion of the geographic region, wherein a vehicle is controlled in the geographic region based at least in part on the third map manifest.

7. The method of claim 6, wherein the first content comprises first map data representing the first portion of the geographic region, the method further comprising:

performing an action of the vehicle based at least in part on the first map data from the third data file, wherein the action includes at least one of a localization action or a planning action, wherein the vehicle is controlled in accordance with the action.

8. The method of claim 6, wherein the map data comprises at least one of: three-dimensional mesh data, two-dimensional tile data, intensity data, road network data, radio-frequency (RF) data, or altitude data.

9. The method of claim 6, wherein the first data file contains three-dimensional mesh data, and the first identifier is determined by providing, as input, the three-dimensional mesh data to the hash function, and receiving, as output, the first identifier.

10. The method of claim 6, wherein the first data file contains two-dimensional tile data, and the first identifier is determined by providing, as input, the two-dimensional tile data to the hash function.

11. The method of claim 6, wherein the first portion of the geographic region comprises first geospatial tiles, and the first data file contains an additional map manifest associated with one or more geospatial tiles of the first geospatial tiles.

12. The method of claim 6, further comprising:

determining, by inputting content of the third data file to the hash function, a third identifier;

determining that the third identifier matches the first identifier; and based on determining that the third identifier matches the first identifier, validating an accuracy of the third data file.

13. The system of claim 1, wherein the tile is a first tile, and the map manifest includes a sub-manifest associated with one or more second tiles of the geospatial tiles.

14. The system of claim 1, wherein the geospatial tiles are first geospatial tiles, and wherein:

the additional map manifest includes an additional value indicative of additional content associated with second geospatial tiles of the second geographic region, and the third map manifest is further determined without accessing the additional content.

15. The system of claim 1, wherein the first hash value is determined by providing, as input to a hash function, the first map data file, the operations further comprising:

determining, by inputting the third map data file to the hash function, a third hash value;

determining a difference between an additional textual representation of the third hash value and at least a portion of the textual representation of the first identifier;

determining, based on the difference, that the first content was retrieved incorrectly; and based on determining that the first content was retrieved incorrectly, redownloading the first content to the third map data file.

16. The method of claim 6, further comprising:

determining, by inputting the third data file to the hash function, an additional hash value;

determining a match between a third textual representation of the additional hash value and at least a portion of the first textual representation; and determining, based on the match, that the third data file is verified as storing the first content.

17. One or more non-transitory computer-readable media storing instructions executable by a processor, wherein the instructions, when executed, cause the processor to perform operations comprising:

receiving first map metadata associated with a first geographic region of an environment, the first map metadata including one or more first hash values indicative of content of respective map data files associated with the first geographic region;

determining, based on comparing the one or more first hash values with one or more second hash values in a second map metadata associated with the first geographic region, a change in a content of a map data file associated with the one or more second hash values;

based on determining the change, retrieving the content of the map data file to a local map data file associated with a vehicle, wherein a first textual representation of a Universal Resource Identifier (URI) of the map data file includes a second textual representation of a hash value indicative of the content of the map data file;

associating the first geographic region and the local map data file;

receiving an additional map metadata associated with a second geographic region of the environment;

determining, based on the first map metadata and the additional map metadata, a third map metadata associated with a third geographic region comprising the first geographic region and the second geographic region, wherein the third map metadata is determined without accessing the content of the map data file or the local map data file; and controlling, based at least in part on the third map metadata, the vehicle to traverse the third geographic region.

18. The one or more non-transitory computer-readable media of claim 17, wherein the map data file is associated with a first geospatial tile of the first geographic region, the operations further comprising:

determining, a third hash value of the one or more second hash values matching the hash value indicative of the content of the map data file, the third hash value associated with a second geospatial tile of the first geographic region; and associating the second geospatial tile with the map data file.

19. The one or more non-transitory computer-readable media of claim 18, wherein the third hash value is a based on Secure Hash Algorithm (SHA), and the Universal Resource Identifier (URI) of the map data file indicates a storage location of the map data file.

20. The one or more non-transitory computer-readable media of claim 17, wherein the respective map data files contain one or more of: geospatial tile data, road network data, intensity data, or altitude data.

* * * * *